Patented Mar. 31, 1936

2,035,459

UNITED STATES PATENT OFFICE 2,035,459

MANUFACTURE OF CHLORINATED INDANTHRONE COMPOUNDS

Edward Burgoine and Charles William Soutar, Manchester, England, assignors to Imperial Chemical Industries Limited, a corporation of Great Britain No Drawing. Application January 26, 1934, Serial No. 708,518. In Great Britain February 2, 1933

13 Claims. (Cl. 260—31)

It is known that flavanthrone can be prepared by the action of antimony pentachloride in nitrobenzene solution on 2-aminoanthraquinone.

We have now discovered that the presence of selenium or selenium chlorides in this reaction prevents or hinders the formation of flavanthrone and promotes the formation of chloroindanthrone. Its action is obviously catalytic. The presence of an additional catalyst, for instance copper acetate, may be advantageous.

The invention is illustrated, but not limited, by the following examples, in which the parts are by weight.

Example 1

To 70 parts of antimony pentachloride in 200 parts mirbane oil (nitrobenzene) are added 4 parts of selenium and 20 parts 2-aminoanthraquinone. The temperature is raised to 170° C. for 1-3 hours. The chloroindanthrone produced is separated by filtration in the form of a bright reddish blue crystalline powder. The product appears to be the same as Caledon Blue GCD (Colour Index No. 1113).

Example 2

To 70 parts of antimony pentachloride in 200 parts of mirbane oil are added 4 parts of selenium and 2 parts of copper acetate, followed by 20 parts of 2-aminoanthraquinone. The temperature is maintained at 160–170° C. for 1–2 hours. The product is isolated as in Example 1, and appears to be the same.

Example 3

To 70 parts of antimony pentachloride in 140 parts of mirbane oil are added 4 parts of selenium and 1 part of copper acetate followed by 20 parts of 2-amino anthraquinone. The temperature is maintained at 120–130° C. for 5–7 hours. The product is isolated as in Example 1, and appears to be the same.

While we do not desire to limit this invention to any particular theory of operation, it will be obvious that during the reaction part of the antimony pentachloride will attack the selenium and produce selenium chlorides. These chlorides are chiefly the monochloride and the tetrachloride. (Text-Book of Inorganic Chemistry, edited by J. Newton Friend, vol. VII, part II, p. 316.) Our invention therefore may be said to consist of reacting $\beta$-amino-anthraquinone and antimony pentachloride in an inert organic solvent and in the presence of such selenium chlorides as are normally produced by the action of antimony pentachloride on selenium. A copper catalyst may also be present.

We claim:

1. Process for the manufacture of chlorinated indanthrones which comprises heating together $\beta$-amino-anthraquinone, antimony pentachloride, and a selenium body chosen from the group consisting of selenium and selenium chlorides, in a medium comprising nitrobenzene.

2. Process as claimed in claim 1 in which the selenium body is selenium itself.

3. Process for the manufacture of chlorinated indanthrones which comprises heating together $\beta$-aminoanthraquinone antimony pentachloride, and a selenium body chosen from the group consisting of selenium and selenium chlorides, in nitrobenzene in the presence of a copper catalyst.

4. Process as claimed in claim 3 in which the selenium body is selenium itself.

5. Process according to claim 3 in which the copper catalyst is copper acetate.

6. Process for the production of chlorinated indanthrones which comprises heating together at about 120–130° C. for several hours, $\beta$-aminoanthraquinone, antimony pentachloride, selenium, copper acetate and nitrobenzene.

7. Process according to claim 6 in which the proportions of the ingredients in the order there named are approximately 1, 3.5, 0.2, 0.05 and 7.

8. A process for the manufacture of chlorinated indanthrone, which comprises heating together $\beta$-amino-anthraquinone, antimony pentachloride and a selenium catalyst in an inert organic solvent.

9. A process for the manufacture of chlorinated indanthrone, which comprises heating together $\beta$-amino-anthraquinone, antimony pentachloride, a selenium catalyst, and a copper catalyst in an inert organic solvent.

10. A process for the manufacture of chlorinated indanthrone, which comprises heating together at a temperature between 120 and 170° C., substantially 70 parts of antimony pentachloride, 4 parts of selenium, 20 parts of 2-aminoanthraquinone, and 200 parts of nitrobenzene, and recovering the insoluble reaction product.

11. A process as in claim 10, the mixture of reactants containing further 1 to 2 parts of copper acetate.

12. A process for the manufacture of chlorinated indanthrone, which comprises heating together β-amino-anthraquinone and antimony pentachloride in nitrobenzene and in the presence of such chlorides of selenium as are normally produced by the interaction of selenium and antimony pentachloride.

13. A process as in claim 12, the reaction mass containing further a copper catalyst.

EDWARD BURGOINE.
CHARLES WILLIAM SOUTAR.